United States Patent
Hirata et al.

(10) Patent No.: US 6,891,424 B1
(45) Date of Patent: May 10, 2005

(54) MONOLITHIC PAYLOAD IF SWITCH

(75) Inventors: Erick M. Hirata, Torrance, CA (US); Lloyd F. Linder, Agoura Hills, CA (US)

(73) Assignee: TelASIC Communications, Inc., El Segundo, CA (US)

( * ) Notice: Subject to any disclaimer, the term of this patent is extended or adjusted under 35 U.S.C. 154(b) by 0 days.

(21) Appl. No.: 09/408,114

(22) Filed: Sep. 29, 1999

(51) Int. Cl.$^7$ .............................................. H03K 17/62
(52) U.S. Cl. ...................... 327/403; 327/407
(58) Field of Search .................... 327/403–404, 327/407, 408; 370/390, 414

(56) References Cited

U.S. PATENT DOCUMENTS

| | | | | |
|---|---|---|---|---|
| 4,984,249 A | * | 1/1991 | Long et al. ................. | 375/293 |
| 5,412,380 A | * | 5/1995 | Matsuda et al. ............ | 327/432 |
| 5,420,534 A | * | 5/1995 | Elabd ......................... | 327/404 |
| 5,475,679 A | * | 12/1995 | Munter ...................... | 370/58.2 |
| 5,786,839 A | * | 7/1998 | Itoh ........................... | 347/211 |
| 5,818,349 A | * | 10/1998 | Dayton .................. | 340/825.79 |

* cited by examiner

Primary Examiner—Dinh T. Le

(74) Attorney, Agent, or Firm—Morrison & Foerster LLP

(57) ABSTRACT

A crosspoint switch architecture (10). The inventive architecture (10) includes a monolithic substrate (11) on which a plurality (N) of electrical inputs are provided. In addition, a plurality (M) of electrical outputs are provided on the substrate (11). A switch is disposed on the substrate (11) for selectively interconnecting the inputs to the outputs and a control circuit (16) is disposed on the substrate (11) for controlling the switch. The switch comprises M, N to 1, multiplexers (14), each multiplexer (14) being adapted to receive each of the N electrical inputs. In the illustrative embodiment, each of the N inputs to each of the multiplexers is received through a respective one of N switchable amplifiers (18). The output of each amplifier (18) is provided to a respective one of N switchable isolation buffers (19). The outputs of the buffers (19) are summed and buffered to provide the output of each multiplexer (14). The control circuit (16) selects which input is to be passed through to the output of a given multiplexer (14). In the illustrative embodiment, the control circuit (16) includes a serial in, parallel out shift register and decode logic circuitry.

10 Claims, 4 Drawing Sheets

MONOLITHIC PAYLOAD IF SWITCH

BACKGROUND OF THE INVENTION

1. Field of the Invention

The present invention relates to communication systems. More specifically, the present invention relates to switching systems used satellite communication applications.

2. Description of the Related Art

Intermediate frequency (IF) crosspoint switches are used on satellites to provide routing and redundancy between data communication channels. The channels route IF signals and data in a link between antennas via the downconversion circuitry of an IF receiver and the upconversion circuitry of a radio frequency (RF) transmitter within the communications payload of the satellite.

Previously, crosspoint switches were implemented on multiple chips, typically in a 50 ohm environment and with Gallium Arsenide (GaAs) technology. The GaAs approach required GaAs switches, low noise amplifiers (LNAs) and attenuators. This also typically required the use of complementary metal-oxide semiconductor (CMOS) integrated circuits to provide selectable control of the numerous connections needed to provide redundancy and routing between the chips.

Accordingly, conventional crosspoint switches were large, heavy, expensive devices that dissipated a considerable amount of power due to the need for multiple individually packaged components that required a characteristic impedance match interface.

In addition, as a result of using individual GaAs chips to implement an IF switch function, a large amount of routing lines were required on the board which tended to degrade channel-to-channel isolation. There were also unacceptable gain variations as a function of the output channels selected.

Hence, a need exists in the art for a low power dissipation, small, lightweight inexpensive system or method for effecting switching and routing data between channels within a satellite communications payload which provides acceptable channel-to-channel isolation and gain uniformity.

SUMMARY OF THE INVENTION

The need in the art is addressed by the crosspoint switch architecture of the present invention. The inventive architecture includes a monolithic substrate on which a plurality (N) of electrical inputs are provided. In addition, a plurality (M) of electrical outputs are provided from the substrate. A switch is disposed on the substrate for selectively interconnecting the inputs to the outputs and a control circuit is disposed on the substrate for controlling the switch. The switch comprises M, N to 1, multiplexers, each multiplexer being adapted to receive each of the N electrical inputs.

In the illustrative embodiment, each of the N inputs to each of the multiplexers is received through a respective one of N switchable amplifiers. The output of each amplifier is provided to a respective one of N switchable isolation buffers. The outputs of the buffers are summed and buffered to provide the output of each multiplexer.

The control circuit selects which input is to be passed through to the output of a given multiplexer. In the illustrative embodiment, the control circuit includes serial-in, parallel-out shift registers and decode logic circuitry.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
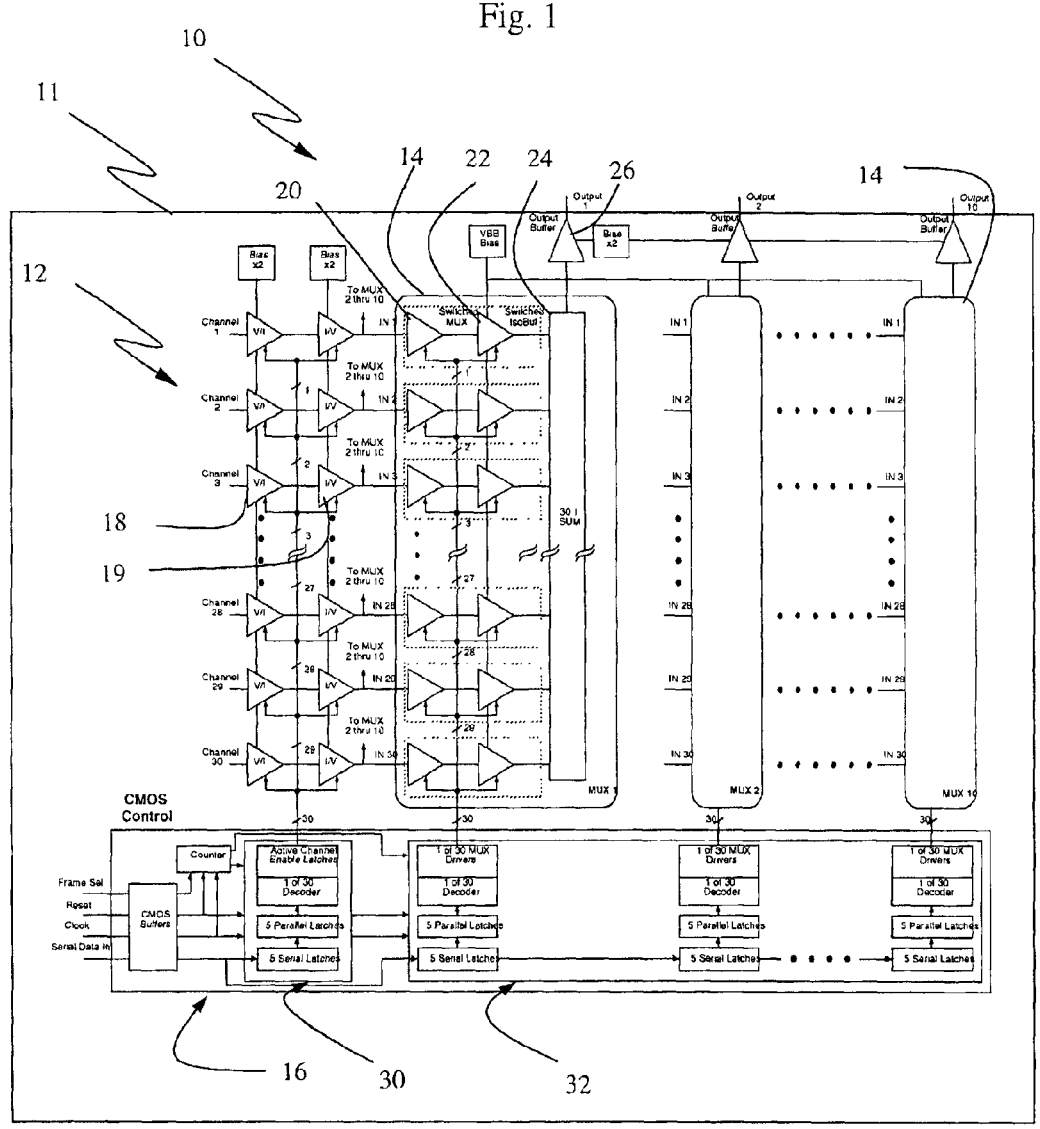
FIG. 1 is an illustrative block diagram implementation of the crosspoint switch of the present invention.

FIG. 1 is an illustrative block diagram implementation of the crosspoint switch of the present invention. All of the elements of the switch 10 are disposed on a single substrate 11 and hence are implemented on a single chip. As shown in FIG. 1, the switch 10 includes a signal distribution network 12 comprising of N dual switchable buffers 18. The N switch inputs next pass through an associated buffer amplifier 19 which fans each of the inputs, 1:M, to the M MUXes 14, one MUX per output.

In the illustrative embodiment shown in FIG. 1, N=30 and M=10. Those skilled in the art will appreciate that the invention is not limited to the number of channels, inputs and outputs utilized.

Each multiplexer 14 includes a plurality of multiplexers 20 and switched isolation buffers 22. Inside each MUX 14, only one of the inputs is routed to the output as determined by the control signal provided by a controller 16. The selection of one of the N inputs in the MUX is accomplished by switching one of the N switched MUX Amp's 20 on and shutting off the others using a 1 of N switch. The MUX is a voltage to current amplifier. Note that since the muxing amplifiers 20 can be shut off, the buffer amplifiers 19 (whose outputs are fanned out 1:M) will be able to drive one or all M switched MUX Amp's (when the same signal is selected in each MUX) and still maintain the gain variation within a given specification.

Each output of the isolation buffer 22 feeds into summing circuit 24. The outputs of the N switched MUX amplifiers (only one of which is active) are current summed at a low impedance function, as opposed to voltage summed, due to the large bandwidth requirement. The current from the active. MUX is the only one feeding a signal to the summing junction. There are no other signal currents from the off channel inputs because they are shut off. However, these inactive MUXes are still physically connected to the summing junction and there may be feed-through from the off input channels.

To further isolate the off-channel inputs from the summing junction, the isolation buffer 22 is provided between the MUX amp output and the summing junction 24. These buffers will be turned off to shunt the undesired feed-through away from the summing junction. Finally the current is converted back into a voltage signal through another amplifier and buffered through an output amplifier 26 capable of driving into a desired input impedance (e.g. 50 ohms in the illustrative embodiment).

Figure 1A:
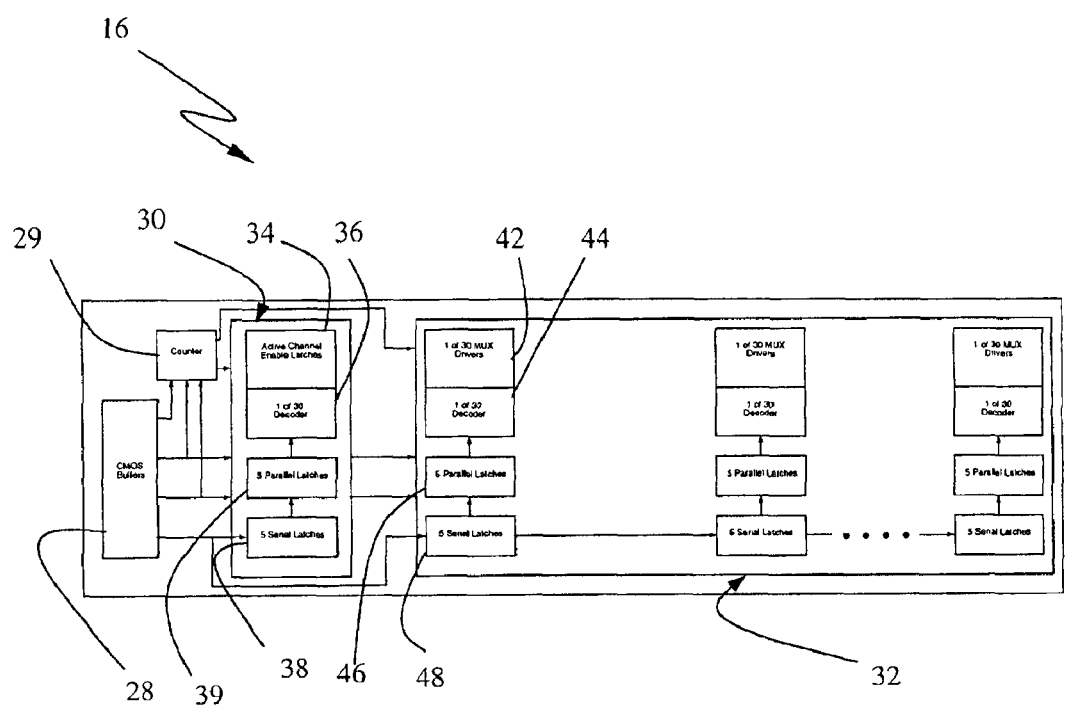
FIG. 1a is a more detailed illustrative block diagram implementation of the controller of the crosspoint switch of the present invention.

FIG. 1*a* is a more detailed illustrative block diagram implementation of the controller 16 of the crosspoint switch 10 of the present invention. In the illustrative embodiment, the controller is implemented in complementary metal-oxide semiconductor (CMOS) technology. The controller 16 is essentially a serial-in, parallel-out (SIPO) register. For the illustrative 30×10 switch matrix, a series of 10, 5 bit words are shifted in and decoded to a 1 of 30 control line. The 10, 1 of 30 control lines selects which of the 30 inputs pass through to the 10 outputs.

The controller 16 includes a CMOS buffer 28, a counter 29, an active enable control circuit 30 and a switch matrix control circuit 32. The CMOS buffer 28 distributes the control signals to the counter, active channel enable and switch matrix control. The counter is enabled by the frame select and sends out a latch command every 5 clock pulses to the active channel enable and every 30 clock pulses to the switch matrix control.

Figure 2:
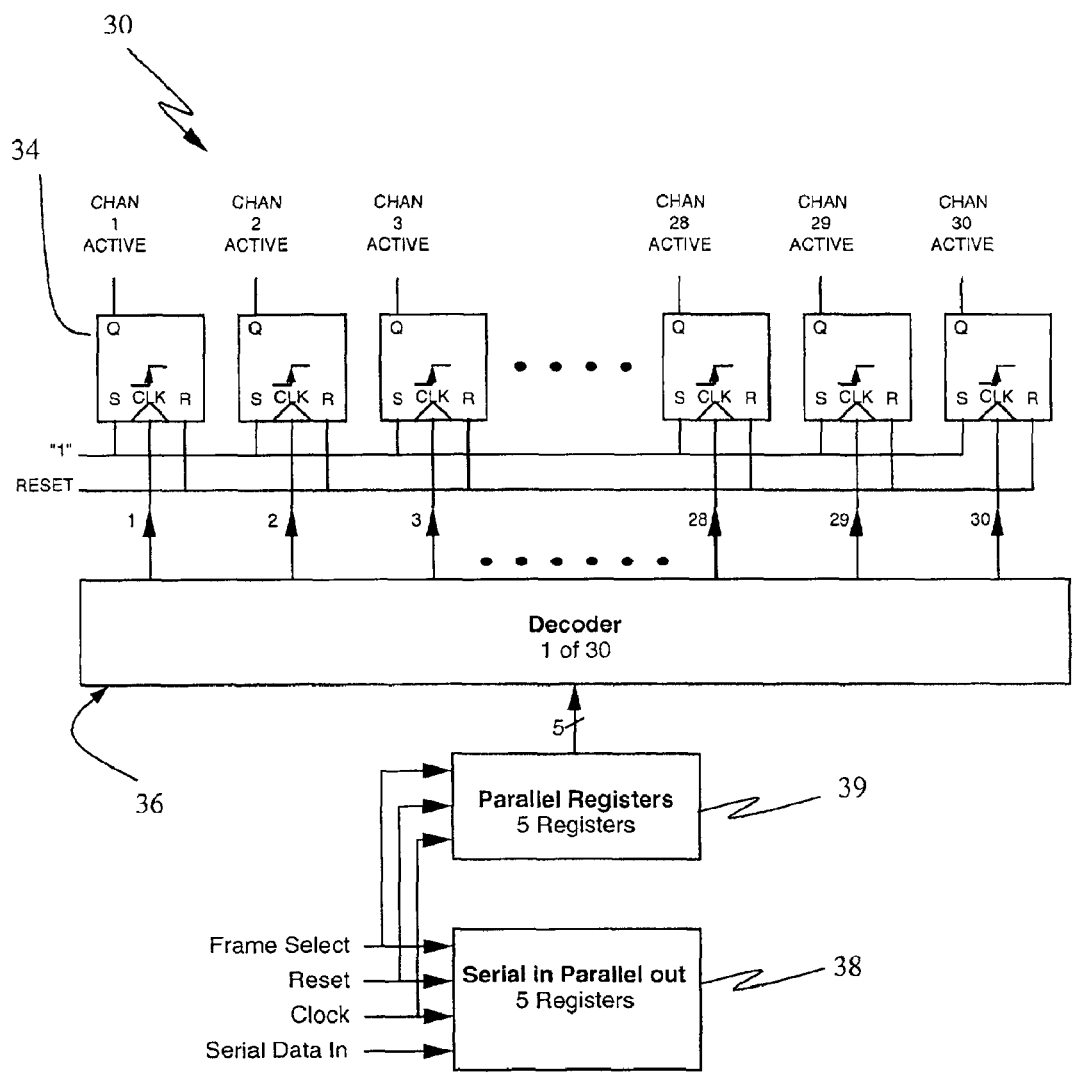
FIG. 2 is an illustrative block diagram implementation of the active channel enable circuit of the controller of the crosspoint switch of the present invention.

FIG. 2 is an illustrative block diagram implementation of the active channel enable circuit of the controller of the crosspoint switch of the present invention. Its purpose is to provide a control that selects only the active channels per every cycle all in one circuit. The active channel enable circuit provides switch controls. The active channel enable circuit 30 sequentially samples each of the 10, 5 bit control words and decodes it to a 1 of 30 control output. These 10, 30-bit words are overlapped and stored in the same 30-bit register 34 which gives a maximum of 10 out of 30 enable signals. Those 10 signals only activate the 10 input amplifiers that are switched to the 10 outputs. Since no more than 10 inputs can be actively switched to the 10 outputs at any one time, all of the other input amplifiers are not used and are shut down to save power.

In the illustrative embodiment, the active channel enable circuit 30 includes a serial-in, parallel-out shift register 38, a set of parallel registers 39, a decoder 36 and 30-bit register 34. The decoder may be implemented with combinational logic. The decoder 36 translates a parallel input word from the registers 39 into an output signal on one of 30 control lines. The decoder output signals are latched and overlapped 10 times by the flip-flops 34 for timely output.

Figure 3:
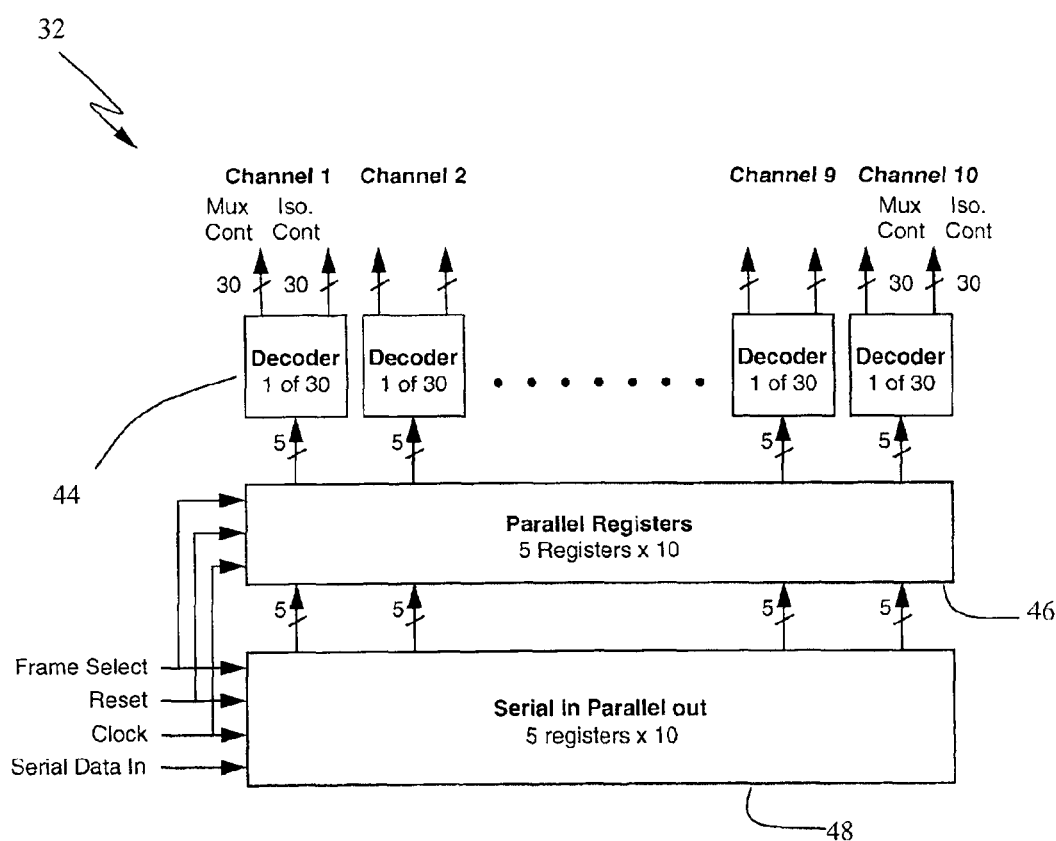
FIG. 3 is an illustrative block diagram implementation of the switch matrix control circuit of the controller of the crosspoint switch of the present invention.

FIG. 3 is an illustrative block diagram implementation of the switch matrix control 32 of the controller of the crosspoint switch of the present invention. Its purpose is to switch any one of 30 inputs to any one of 10 outputs. The matrix 32 includes a set (e.g. 50) of serial-in, parallel-out shift registers 48 that feed a set (e.g. 50) of parallel registers 46. The parallel registers 46 provide inputs to a plurality (e.g. 10) of decoders 44. The outputs of the decoder are the controls for the MUX switch matrix and are buffer by the 1 of 30 MUX drivers 42 (shown on FIGS. 1 and 1*a* only).

In order to minimize crosstalk to the chip, ground lines are added between the inputs and between the output signal lines. Additionally, any signal lines on chip that need to cross over or under other signal lines will be shielded by the ground planes.

To maintain signal isolation for the IC, there should be 2 ground pads around each signal input and output.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A crosspoint switch architecture having:

a monolithic substrate;

a plurality (N) of electrical inputs provided on said substrate;

a plurality (M) of electrical outputs provided on said substrate;

switch means disposed on said substrate for selectively interconnecting said inputs to said outputs, said switch means having M multiplexers and a plurality (N) switchable amplifiers, each of said switchable amplifier operatively coupled to a corresponding one of said N inputs; and means disposed on said substrate for controlling said switch means, wherein each multiplexer includes N selection multiplexers, wherein each of said N inputs to each of said multiplexer is received through a respective one of said N switchable amplifiers, and wherein one of the N inputs can be selected for outputting to one of the M outputs by switching on the corresponding switchable amplifiers and disabling the rest of the switchable amplifiers.

2. The invention of claim 1, wherein the Switch means further comprise a plurality (N) of isolation buffers, each of said isolation buffers operatively coupled to the output of a corresponding one of switchable amplifiers.

3. The invention of claim 1 wherein said control means includes a serial in, parallel out shift register.

4. A crosspoint switch architecture having:

a monolithic substrate;

a plurality (N) of electrical inputs provided on said substrate;

a plurality (M) of electrical outputs provided on said substrate;

switch means disposed on said substrate for selectively interconnecting said inputs to said outputs, said switch means having M multiplexers; and means disposed on said substrate for controlling said switch means, wherein each multiplexer includes N selection multiplexers.

5. The invention of claim 4 further including means for summing the outputs of said N selection multiplexers to provide a single output.

6. The invention of claim 5 further including means for buffering said single output.

7. A crosspoint switch architecture having:

a monolithic substrate;

a plurality (N) of electrical inputs provided on said substrate;

a plurality (M) of electrical outputs provided on said substrate;

switch means disposed on said substrate for selectively interconnecting said plurality of electrical inputs to said plurality of electrical outputs, said switch means having M multiplexers; and means disposed on said substrate for controlling said switch means wherein each multiplexer includes N selection multiplexers, and wherein each of said N inputs to each of said N selection multiplexers is received through a respective one of N switchable isolation buffers.

8. The invention of claim 7 further including means for buffering said single output.

9. A crosspoint switch architecture having:

a monolithic substrate;

a plurality (N) of electrical inputs provided on said substrate;

a plurality (M) of electrical outputs provided on said substrate;

M multiplexers disposed on said substrate for selectively interconnecting said plurality of electrical inputs to said plurality of electrical outputs, each of said multiplexers being an N to 1 multiplexer, whereby each multiplexer is adapted to receive each of said plurality of electrical inputs; and a serial in, parallel out shift register disposed on said substrate for controlling said multiplexers, wherein each multiplexer includes N selection multiplexers.

10. The invention of claim 9 further including means for buffering said single output.

* * * * *